United States Patent [19]
Matsunaga

[11] Patent Number: 6,130,831
[45] Date of Patent: Oct. 10, 2000

[54] POSITIVE-NEGATIVE PULSE TYPE HIGH FREQUENCY SWITCHING POWER SUPPLY UNIT

[75] Inventor: Koichi Matsunaga, Kobe, Japan

[73] Assignee: Haiden Laboratory Inc., Hyogo, Japan

[21] Appl. No.: 09/422,120

[22] Filed: Oct. 20, 1999

[30] Foreign Application Priority Data

Oct. 21, 1998 [JP] Japan .................................. 10-299993

[51] Int. Cl.⁷ .................................................. H02M 3/335
[52] U.S. Cl. ................................ 363/98; 363/17; 363/132
[58] Field of Search ................................ 363/15, 16, 17, 363/34, 95, 97, 98, 131, 132

[56] References Cited

U.S. PATENT DOCUMENTS

| | | | |
|---|---|---|---|
| 3,609,507 | 9/1971 | Beck | 363/41 |
| 5,550,498 | 8/1996 | Kwan et al. | 327/175 |
| 5,625,539 | 4/1997 | Nakata et al. | 363/17 |
| 5,654,882 | 8/1997 | Kanazawa et al. | 363/37 |
| 5,719,758 | 2/1998 | Nakata et al. | 363/98 |
| 5,844,193 | 12/1998 | Nomura et al. | 219/110 |
| 5,946,200 | 8/1999 | Kim et al. | 363/17 |
| 5,963,436 | 10/1999 | Yoshida | 363/17 |
| 6,038,142 | 3/2000 | Fraidlin et al. | 363/17 |

FOREIGN PATENT DOCUMENTS

| | | | |
|---|---|---|---|
| 1-318560 | 12/1989 | Japan | H02M 7/48 |
| 7-107751 | 4/1995 | Japan | H02M 7/537 |
| 9-172787 | 6/1997 | Japan | H02M 7/538 |

*Primary Examiner*—Adolf Deneke Berhane
*Attorney, Agent, or Firm*—Sughrue, Mion, Zinn, Macpeak & Seas, PLLC

[57] ABSTRACT

The invention provides a positive-negative type high frequency switching power supply unit which provides a high frequency output of an ideal sine waveform to allow reliable switching with very low switching loss without being influenced by a leakage inductance of the load side, a parasitic capacitance and a parasitic inductance produced by a wiring line or the like, and a load condition. The positive-negative type high frequency switching power supply unit includes an H-bridge switching circuit including four semiconductor switching elements connected in an H-bridge connection, a resonance circuit which resonates with a positive-negative pulse wave outputted from the H-bridge switching circuit, and a PWM control circuit for detecting a voltage and current of the resonance circuit by means of a pulse transformer and a current detector, respectively, and feeding back the voltage and current to the H-bridge switching circuit so that the four semiconductor switching elements may perform switching operations in a switching frequency higher than the resonance frequency of the resonance circuit in a fixed switching pattern of on/off states.

4 Claims, 14 Drawing Sheets

(A)

(B)

POSITIVE-NEGATIVE PULSE TYPE HIGH FREQUENCY SWITCHING POWER SUPPLY UNIT

BACKGROUND OF THE INVENTION

1. Field of the Invention

The present invention relates to a positive-negative pulse type high frequency switching power supply unit which applies positive and negative pulse voltages in a high frequency to a load, and more particularly to a positive-negative pulse type high frequency switching power supply unit which can be utilized widely to various apparatus including an atmospheric plasma generator, a DC/DC converter, a battery charger, a high frequency corona processor, an ozone generator, an invertor for a motor, a sputtering apparatus, a lamp light source, a soldering apparatus and a discharging unit.

2. Description of the Related Art

A positive-negative pulse type high voltage power supply unit is disclosed in Japanese Patent Laid-Open No. Hei 9-172787. The positive-negative pulse type high voltage power supply unit is constructed in the following manner to assure good rising and falling characteristics of high positive and negative pulse voltages. It is to be noted that, in the following paragraph, a reference symbol same as that used in Japanese Patent Laid-Open No. Hei 9-172787 is added in a parenthesis to each component in order to facilitate recognition.

In particular, a first switching element (SW1), a second switching element (SW2) and a third switching element (SW3) are connected in series between a positive voltage generation section (+E) and the ground, and a load (R) is connected between a node between the first switching element (SW1) and the second switching element (SW2) and the ground while a fourth switching element (SW4) is connected to a node between a negative voltage generation section (−E) and the node between the first switching element (SW1) and the second switching element (SW2) connected to the load (R). The first switching element (SW1) is first turned on to apply a positive voltage to the load (R) and then the second switching element (SW2) is turned on to discharge the positive charge of the load (R) by the circuit to the ground through a diode (D3) connected in parallel to the third switching element (SW3). Then, the fourth switching element (SW4) is turned on to apply a negative voltage to the load (R) and then the third switching element (SW3) is turned on to discharge the negative charge of the load (R) by the circuit to the load R through a diode (D2) connected in series to the second switching element (SW2).

The conventional positive-negative pulse type high voltage power supply unit is advantageous in that, because the voltage values of the high positive-negative pulse voltages are variable individually, where the power supply unit is applied as a power supply for a discharger, the ion balance can be adjusted. However, the power supply unit has a problem that it requires positive and negative power supplies (the positive voltage generation section +E and the negative voltage generation section −E) as power supplies to be supplied to the switching elements.

Another positive-negative pulse type high voltage power supply unit is disclosed in Japanese Patent Publication No. Hei 7-57100 wherein four semiconductor elements are connected in an H-bridge configuration and are switched alternately between positive and negative voltages at the ratio of 50/50%. Further, the power supply unit adopts a PDM (pulse density modulation) system wherein a rest period is provided between pulses in the waveform of an output pulse signal at the ratio of 50/50% between the positive and the negative voltages as seen in FIG. 12 to obtain high voltage pulses resonant with the output side.

The positive-negative pulse type high voltage power supply unit just described, however, is disadvantageous in that it is complicated in circuit configuration and is difficult in modulation control and besides a wide modulation width cannot be assured.

Also such a further positive-negative pulse type high voltage power supply unit as shown in FIG. 13 is conventionally known. Referring to FIG. 13, the positive-negative pulse type high voltage power supply unit shown employs an H-bridge switching circuit wherein four first, second, third and fourth semiconductor switching elements SW1, SW2, SW3 and SW4 are connected in an H-bridge connection and diodes D1, D2, D3 and D4 are connected in parallel to the semiconductor switching elements SW1, SW2, SW3 and SW4, respectively. The positive-negative pulse type high voltage power supply unit successively and repetitively performs a switching operation in a pattern of four on/off combinations of stages ①, ②, ③ and ④ listed in Table 1 given below:

TABLE 1

|     | ① | ② | ③ | ④ |
|-----|-----|-----|-----|-----|
| SW1 | ON  | OFF | OFF | OFF |
| SW2 | OFF | OFF | ON  | OFF |
| SW3 | ON  | OFF | OFF | OFF |
| SW4 | OFF | OFF | ON  | OFF |

In particular, referring to FIG. 13, the four semiconductor switching elements SW1, SW2, SW3 and SW4 are all in an off state first (the load is off at the opposite ends thereof). Then, if signals are inputted simultaneously to the gates of the semiconductor switching elements SW1 and SW3, then current flows in the direction indicated by an arrow mark I1 in FIG. 13 and charges the load. Thereafter, the gate signals to the semiconductor switching elements SW1 and SW3 are stopped. However, the charge accumulated in the load remains in the load. Then, if signals are applied simultaneously to the gates of the semiconductor switching elements SW2 and SW4, then current flows in the direction indicated by another arrow mark I2 in FIG. 13 and discharges the load. Thereafter, the gate signals to the semiconductor switching elements SW2 and SW4 are stopped. However, the charge of the opposite polarity accumulated in the load remains in the load.

Accordingly, even if the gate signals to the semiconductor switching elements SW1 and SW3 or SW2 and SW4 stop, the output pulse signal does not fall immediately, but the output pulse waveform is influenced by a floating capacitance and a leakage inductance of the load such that, where the load is light and is a capacitive load, a pulse is extended to a rising edge of a next pulse as seen from the waveform (A) of FIG. 14, but where the load is a reactive load, each pulse is distorted at the leading and trailing edges thereof as seen from the waveform (B) of FIG. 14. Consequently, accurate PWM (Pulse Width Modulation) cannot be achieved.

Further, a conventional high-capacity high frequency power supply unit has following problems because it usually employs a self-excited invertor which includes a series resonance or parallel resonance type converter to cause resonation to occur.

(1) In order to stabilize the output of the self-excited invertor, such a controlling method as to supply dc current to a transformer using a circuit such as a magnetic amplifier to cause leakage to occur is used, and therefore, it is difficult to design the high-capacity high frequency power supply unit.

(2) Where a self-excited oscillation system is employed, the frequency to be applied to a transformer is varied for frequency control, and therefore, a large amount of heat is generated.

(3) Where a self-excited invertor is used, output control of 0 to 100% cannot be achieved.

SUMMARY OF THE INVENTION

It is an object of the present invention to provide a positive-negative pulse type high frequency switching power supply unit which allows efficient and stabilized PWM (Pulse Width Modulation) control to be performed without being influenced by a condition of a load even if the width of an output pulse is continuously varied from a small pulse width to a large pulse width while a single power supply voltage is used for semiconductor switching elements.

It is another object of the present invention to provide a positive-negative pulse type high frequency switching power supply unit by which, when semiconductor switching elements are PWM controlled, generation of switching noise by a surge upon turning on or turning off of the semiconductor switching elements can be suppressed and the semiconductor switching elements can be switched with certainty and with minimized switching loss without being influenced by a leakage inductance of the load side, a parasitic capacitance or a parasitic inductance produced by a wiring line and so forth, a load condition and so forth and besides a high frequency output of an ideal sine waveform can be obtained.

In order to attain the object described above, according to the present invention, a positive-negative pulse type high frequency switching power supply unit is constructed such that it includes, as a high frequency switching circuit, an H-bridge switching circuit (invertor) including four semiconductor switching elements connected in an H-bridge connection and diodes individually connected in parallel to the semiconductor switching elements. The four semiconductor switching elements are switched in a fixed order so that a symmetrical positive and negative pulse signal waveform is outputted from the H-bridge switching circuit. The pulse signal waveform is supplied to a resonance circuit to cause the resonance circuit to resonate so that a high frequency sine waveform signal is extracted from the resonance circuit. Further, a voltage signal and a current signal of the resonance circuit are fed back to control the semiconductor switching elements so that they may effect zero volt switching by separately excited PWM control. By the construction, stabilization of a high frequency output and suppression of switching noise are realized.

More particularly, according to the present invention, there is provided a positive-negative pulse type high frequency switching power supply unit, comprising an H-bridge switching circuit including four first, second, third and fourth semiconductor switching elements connected in an H-bridge connection and first, second, third and fourth diodes connected in parallel to the first, second, third and fourth semiconductor switching elements, respectively, a dc voltage being applied to the first, second, third and fourth semiconductor switching elements, a resonance circuit which resonates with a positive-negative pulse wave outputted from the H-bridge switching circuit, and a pulse width modulation control circuit for detecting a voltage or current of the resonance circuit and controlling the first, second, third and fourth semiconductor switching elements to successively and repetitively perform switching operations in an on/off switching pattern including a first stage wherein the first and fourth semiconductor switching elements are off and the second and third semiconductor switching elements are on, a second stage wherein the first and third semiconductor switching elements are on and the second and fourth semiconductor switching elements are off, a third stage wherein the first and fourth semiconductor switching elements are off and the second and third semiconductor switching elements are on, a fourth stage wherein the first and third semiconductor switching elements are off and the second and fourth semiconductor switching elements are on, and a fifth stage wherein the first and fourth semiconductor switching elements are off and the second and third semiconductor switching elements are on so that the first, second, third and fourth semiconductor switching elements may switch in a switching frequency higher than a resonance frequency of the resonance circuit.

In the positive-negative type high frequency switching power supply unit, the second and third diodes are off in the first and second stages; the second diode is off and the third diode is on in the third stage; the second and third diodes are off in the fourth stage; and the second diode is on and the third diode is off in the fifth stage.

Preferably, in order to assure the stability and the safety of the operations of the first, second, third and fourth semiconductor elements, the pulse width modulation control circuit supplies gate pulses to gates of the first, second, third and fourth semiconductor switching elements so that the time width with which the second semiconductor switching element is turned off is longer than and extends forwardly and backwardly in time of the time width with which the first semiconductor switching element is turned on whereas the time width with which the third semiconductor switching element is turned off is longer than and extends forwardly and backwardly in time of the time width with which the fourth semiconductor switching element is turned on.

The positive-negative type high frequency switching power supply unit may further comprise voltage detection means for detecting a voltage of the resonance circuit, effective value conversion means for converting the detected voltage into a voltage effective value, current detection means for detecting current of the resonance circuit, effective value conversion means for converting the detected current into a current effective value, and an effective value selection circuit for comparing the voltage effective value and the current effective value from both of the effective value conversion means with respective preset values to detect differences and selectively feeding back one of the differences to the pulse width modulation control circuit. Where the positive-negative type high frequency switching power supply unit comprises the additional components mentioned, the output voltage or current of the resonance circuit is fixed.

Operation of the positive-negative type high frequency switching power supply unit according to the present invention is described specifically with reference to the drawings. First, operation of the H-bridge switching circuit including the four first, second, third and fourth semiconductor switching elements denoted by SW1, SW2, SW3 and SW4 in an equivalent circuit of FIG. 2 is described with reference to FIG. 2. When the first semiconductor switching element SW1 is turned on from an off state, current flows in the direction indicated by an arrow mark I1 and charges a load 3 to the positive. Then, when the first semiconductor switching element SW1 is turned off and then the second semiconductor switching element SW2 is turned on, then current flows in the direction indicated by an arrow mark I2 through the second semiconductor switching element SW2 and the third diode denoted by D3. Consequently, a leakage inductance and a floating capacitance of the load 3 are reset compulsorily by the second semiconductor switching element SW2 and the third diode D3.

Thereafter, when the third semiconductor switching element SW3 is turned off and then the fourth semiconductor switching element SW4 is turned on, current flows in the direction indicated by an arrow mark I3 and charges the load 3 to the negative. Then, when the fourth semiconductor switching element SW4 is turned off and the third semiconductor switching element SW3 is turned on, current flows in the direction indicated by an arrow mark I4, and the leakage inductance and the floating capacitance of the load 3 are reset compulsorily by the second semiconductor switching element SW2 and the third diode D3.

Further, in the positive-negative type high frequency switching power supply unit according to the present invention, since the voltage signal or the current signal of the resonance circuit is fed back to control the semiconductor switching elements so that they may effect zero volt switching by separately excited PWM control, the principle of zero volt switching is described below with reference to FIGS. 4 and 5.

Generally, a series resonance or parallel resonance converter is formed as a current resonance type converter, wherein operation of the semiconductor switching elements is non-zero volt switching. Therefore, upon turning off of each semiconductor switching element, high current flows and high switching loss occurs. Further, turning on occurs at a high voltage, and charge accumulated in the parasitic capacitance of the semiconductor switching element is discharged compulsorily by the semiconductor switching element, whereupon an excessive current surge flows through the semiconductor switching element.

Therefore, in the positive-negative type high frequency switching power supply unit according to the present invention, zero volt switching is achieved by selecting the switching frequency of the semiconductor switching elements higher than the resonance frequency and providing dead times in which both of the set of first and second semiconductor switching elements exhibit an off state.

As seen in FIG. 4, initially the second semiconductor switching element SW2 is on and the first semiconductor switching element SW1 is off. When the second semiconductor switching element SW2 is turned off, then current flows in the directions indicated by an associated arrow mark IS2 and charges a parasitic capacitance C2 of the second semiconductor switching element SW2. Since a parasitic capacitance C1 of the first semiconductor switching element SW1 initially is in a charged up state, as the value of a voltage at a node Vx1 between the first and second switching elements SW1 and SW2 rises, the parasitic capacitance C1 discharges. After the potential of the voltage at the node VX1 reaches a power supply voltage E1, the first diode denoted at D1 is turned on. Thus, if the first semiconductor switching element SW1 is turned on while the first diode D1 is on, then the first semiconductor switching element SW1 effects zero volt on switching, and if the second semiconductor switching element SW2 is turned off while a parasitic capacitance C2 of the second semiconductor element SW2 is in a charged up state, then the second semiconductor switching element SW2 effects zero volt off switching.

In FIG. 5, initially the first semiconductor switching element SW1 is on and the second semiconductor switching element SW2 is off. If the first semiconductor switching element SW1 is turned off, then the parasitic capacitance C1 thereof is charged and current flows in the direction indicated by an associated arrow mark IS1 therethrough. Thus, the first semiconductor switching element SW1 effects zero volt switching. Meanwhile, before the second semiconductor switching element SW2 is turned on, charge in the parasitic capacitance C2 thereof flows as current in the direction indicated by an associated arrow mark I1. Then, if the second semiconductor switching element SW2 is turned on after the charging of the parasitic capacitance C1 is completed and the discharging of the parasitic capacitance C2 is completed, than also the second semiconductor switching element SW2 effects zero volt switching. Such operations as described above are illustrated in a timing chart of FIG. 6(*a*). FIG. 6(*b*) shows part of the timing chart of FIG. 6(*a*) in an enlarged scale.

If a positive and negative pulse wave is inputted to such a resonance circuit which includes two inductors L1 and L2 and a capacitor C as shown in FIG. 7, then it appears as a voltage of a sine waveform across the capacitor C due to resonance of the inductors L1 and L2 and the capacitor C, and the voltage of the sine waveform is outputted from the resonance circuit. When a resonance circuit is used for PWM control, if the circuit is so configured that the current output thereof exhibits a peak at the center of the switched pulse output voltage thereof as seen in FIG. 8, then maximum current flows through a semiconductor switching element, and therefore, soft switching (switching with a voltage lower than an intended voltage) is avoided.

Thus, if the switching frequency is selected higher than the resonance frequency, then the output current varies with a delayed phase, and if the current waveform is selected so that it exhibits a peak at a point of time when the switched voltage waveform comes to an end (when a pulse rises or drops), then zero volt switching is obtained. Where the resonance circuit of the construction just described is used for PWM control, if the H-bridge switching circuit including the four first, second, third and fourth semiconductor switching elements SW1, SW2, SW3 and SW4 is compulsorily reset at a point of time when an input pulse to be gated by the H-bridge switching circuit comes to an end, then the leakage inductance of the load side is reset, and a high frequency output of an ideal sine waveform free from spike noise and so forth as seen in FIG. 9 is obtained as an output waveform. In this instance, since the voltage signal or the current signal detected by the resonance circuit is fed back and used for PWM control, the high frequency output can have a fixed voltage value, a fixed current value or a fixed power value.

In the positive-negative type high frequency switching power supply unit according to the present invention, the semiconductor switching elements effect zero volt switching by separately excited PWM control in this manner. The separately excited PWM control is superior in the following points to the self-exited oscillation system.

(1) Since the separately excited PWM control allows control with a pulse width, a control circuit therefor can be designed comparatively simply.

(2) Heat generation by a load (transformer) is reduced when compared with the self-excited oscillation system.

(3) The output pulse width can be varied continuously from 0 to 100% without any distortion, and the output can be varied linearly from 0 to 100%.

(4) Since the switching loss of the semiconductor elements is reduced, a high efficiency is obtained, and even if the output capacity is large, the apparatus can be produced with a small size.

Specifically, a self-exited invertor and a separately excited PWM controlled invertor have the following differences from each other in terms of the output noise, the stability against the temperature, the output voltage control system, the facility in designing and the reliability on designing, and the protection against an overload.

(a) Output Noise

With the self-excited invertor, it is difficult to reduce noise by controlling rising/falling speeds of the driving voltage for a switching element. In contrast, with the separately excited PWM controlled invertor, it is possible to reduce output noise by speed control of the driving voltage, and particularly where a MOS FET is used, noise can be reduced without a drop of the efficiency.

(b) Stability Against the Temperature

The self-excited invertor has a problem in starting up when the temperature is low, and cannot sometimes be started. In contrast, the separately excited PWM controlled invertor has no problem in starting up.

(c) Output Voltage Control System

For the self-excited invertor, frequency control is used because pulse width control cannot be applied. In contrast, for the separately excited PWM controlled invertor, pulse width control can be applied readily.

(d) Facility In Designing and the Reliability On Designing

With the self-excited invertor, since it includes a comparatively small number of circuit components, setting is easy, but it cannot exhibit sufficient assurance for characteristic deviations of a transformer and switching elements. In contrast, with the separately excited PWM controlled invertor, operation as designed can be anticipated.

(e) Protection Against an Overload

Although some self-excited invertors have a self-protection function, most of self-excited invertors have a comparatively narrow output control width and have a problem in regard to complete short-circuiting. In contrast, with the separately excited PWM controlled invertor, the control width of the output thereof is so great that, even upon short-circuiting, easy protection is possible, and it is possible to control, upon short-circuiting of the load, the pulse width to turn off the gate pulses.

With the positive-negative type high frequency power supply unit according to the present invention, the following advantages can be achieved.

(1) Since the positive-negative type high frequency switching power supply unit employs an H-bridge switching circuit (invertor) which includes four semiconductor switching elements connected in an H-bridge connection and diodes individually connected in parallel to the semiconductor switching elements, an output of positive and negative pulses which corresponds to a power supply voltage supplied to the positive-negative type high frequency switching power supply unit can be obtained.

(2) Since the switching circuit (invertor) has an H-bridge configuration and simple in construction and besides only a single positive or negative power supply with respect to the ground is required as a power supply, the positive-negative type high frequency switching power supply unit according to the present invention can be produced at a reduced cost.

(3) Since the leakage inductance and the floating capacitance of the load can be reset compulsorily, otherwise possible waveform distortion by an influence of them can be eliminated.

(4) When the semiconductor switching elements are PWM controlled, generation of switching noise by a surge upon turning on or turning off of any semiconductor switching element can be suppressed, and the semiconductor switching elements can be switched with certainty and a high frequency output of an ideal sine waveform can be obtained with very low switching loss without being influenced by the leakage inductance of the load side, a parasitic capacitance or a parasitic inductance produced by a wiring line or the like, or a load condition.

(5) Since a voltage and current of the resonance circuit are detected and converted into effective values and the voltage effective value and the current effective value are compared with respective preset values therefor and then one of resulting differences is selected and fed back to the PWM control circuit, the output voltage or current of the resonance circuit can be fixed.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
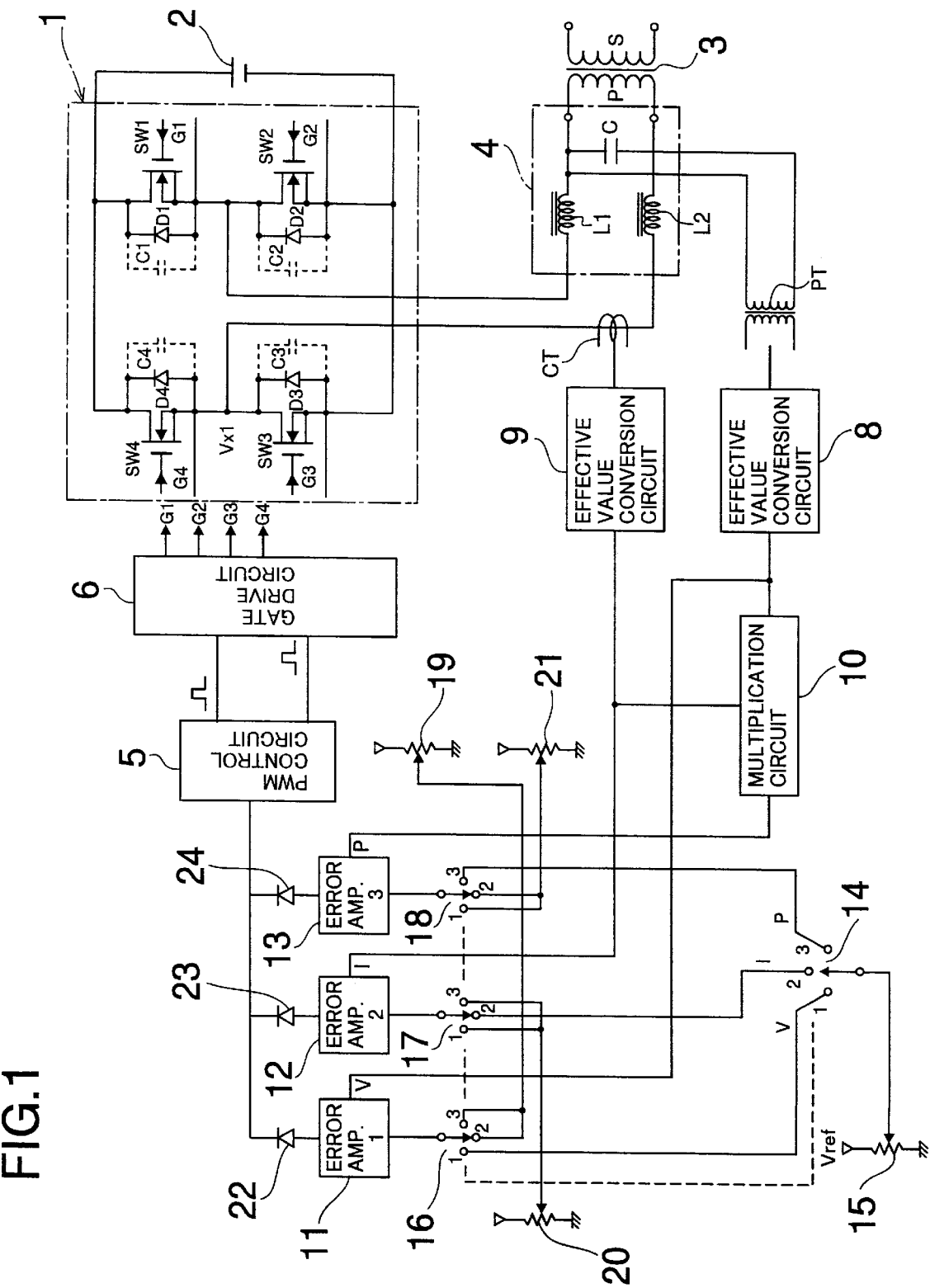
FIG. 1 is a block diagram showing a circuit construction of a positive-negative pulse type high frequency switching power supply unit to which the present invention is applied.

Referring to FIG. 1, there is shown a positive-negative pulse type high frequency switching power supply unit to which the present invention is applied. The power supply unit shown includes an H-bridge switching circuit 1, which in turn includes four first, second, third and fourth semiconductor switching elements SW1, SW2, SW3 and SW4 connected in an H-bridge connection (four modules each including two MOS-FETs or like elements are connected in an H-bridge connection), and diodes D1, D2, D3 and D4 connected in parallel to the semiconductor switching elements SW1, SW2, SW3 and SW4, respectively. A single dc power supply 2 is used as a power supply for the H-bridge switching circuit 1. The semiconductor switching elements SW1, SW2, SW3 and SW4 have parasitic capacitances C1, C2, C3 and C4, respectively.

Figure 3:
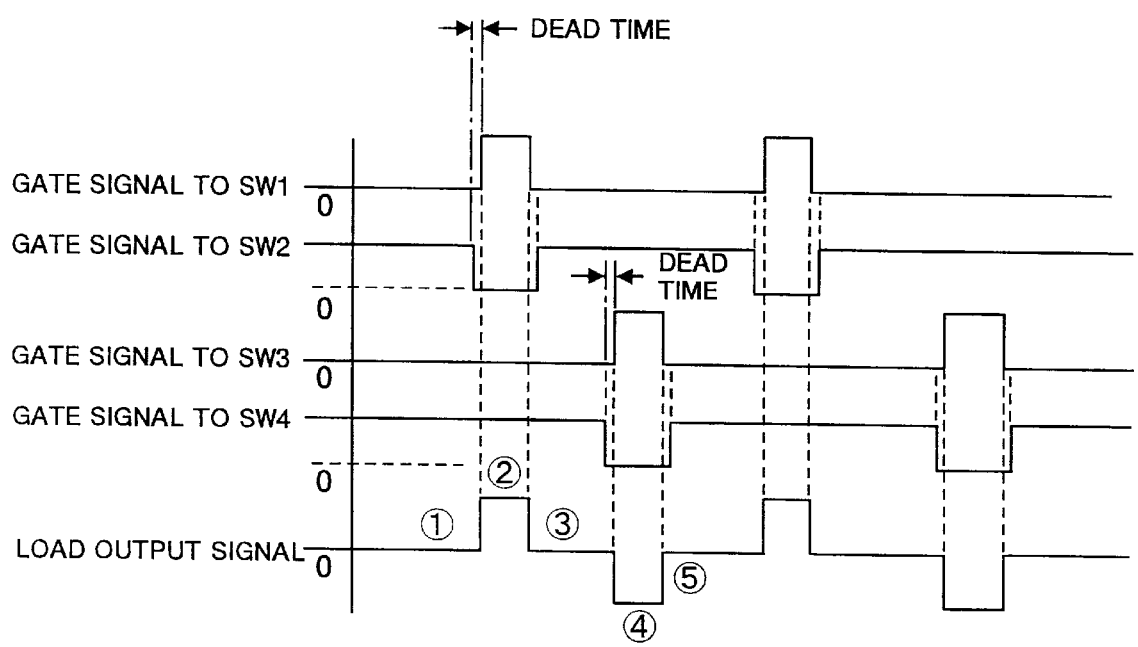
FIG. 3 is a timing chart illustrating operation of the H-bridge switching circuit of FIG. 2.
Figure 4:
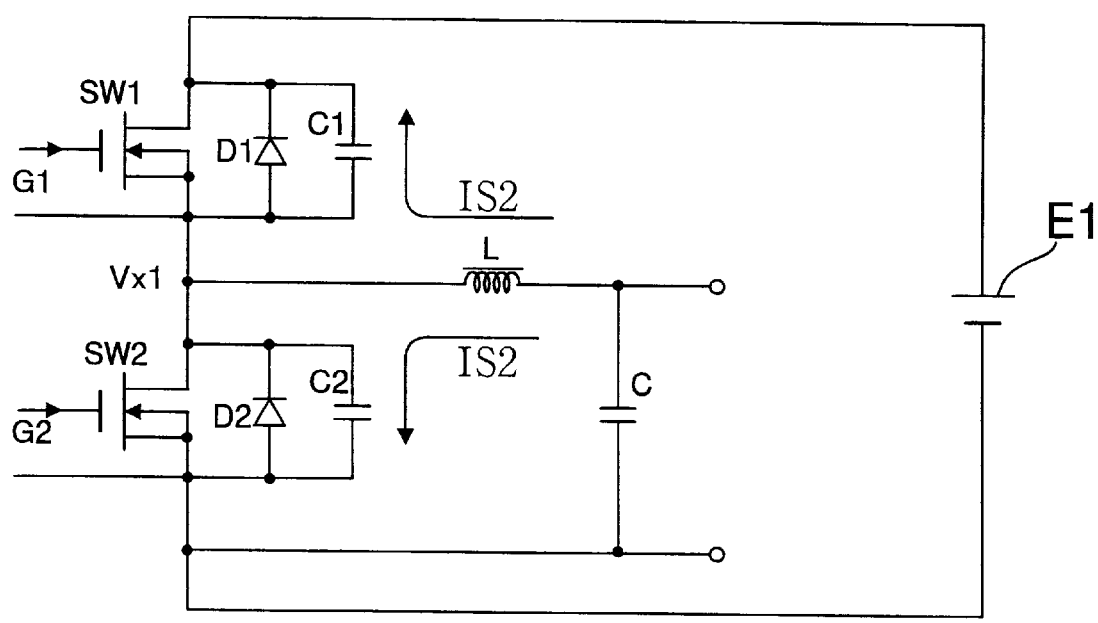
FIG. 4 is a circuit diagram illustrating a zero volt switching operation of semiconductor switching elements of the H-shaped bridge switching circuit of FIG. 2.
Figure 5:
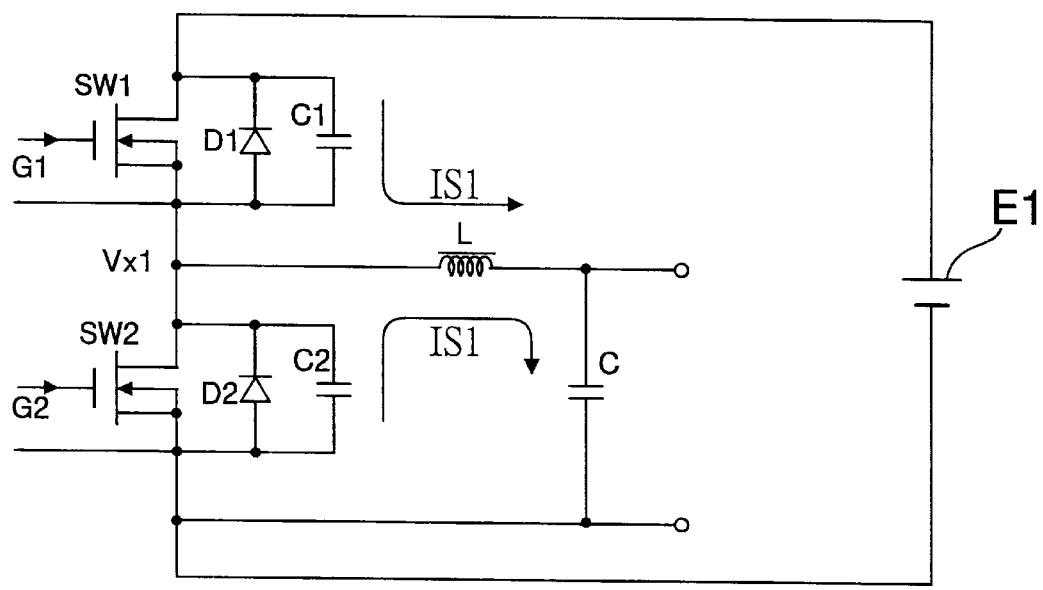
FIG. 5 is a similar view but illustrating another zero volt switching operation of the semiconductor switching elements of the H-shaped bridge switching circuit of FIG. 2.

The H-bridge switching circuit 1 is controlled by such an LC series resonance circuit 4, a PWM control circuit 5 and a gate drive circuit 6 as shown in FIG. 1 so that it successively and repetitively performs a switching operation in a pattern of five ON/OFF combinations of five stages ①, ②, ③, ④ and ⑤ given in Table 2 below. FIG. 3 is a timing chart of alternate positive and negative pulses outputted from between a node between the first and second semiconductor switching elements SW1 and SW2 and a node between the third and fourth semiconductor switching elements SW3 and SW4 by such a switching operation of the H-bridge switching circuit 1 described above.

TABLE 2

|     | ① | ② | ③ | ④ | ⑤ |
|-----|-----|-----|-----|-----|-----|
| SW1 | OFF | ON | OFF | OFF | OFF |
| SW2 | ON | OFF | ON | ON | ON |
| SW3 | ON | ON | ON | OFF | ON |
| SW4 | OFF | OFF | OFF | ON | OFF |
| D2  | OFF | OFF | OFF | OFF | ON |
| D3  | OFF | OFF | ON | OFF | OFF |

Figure 2:
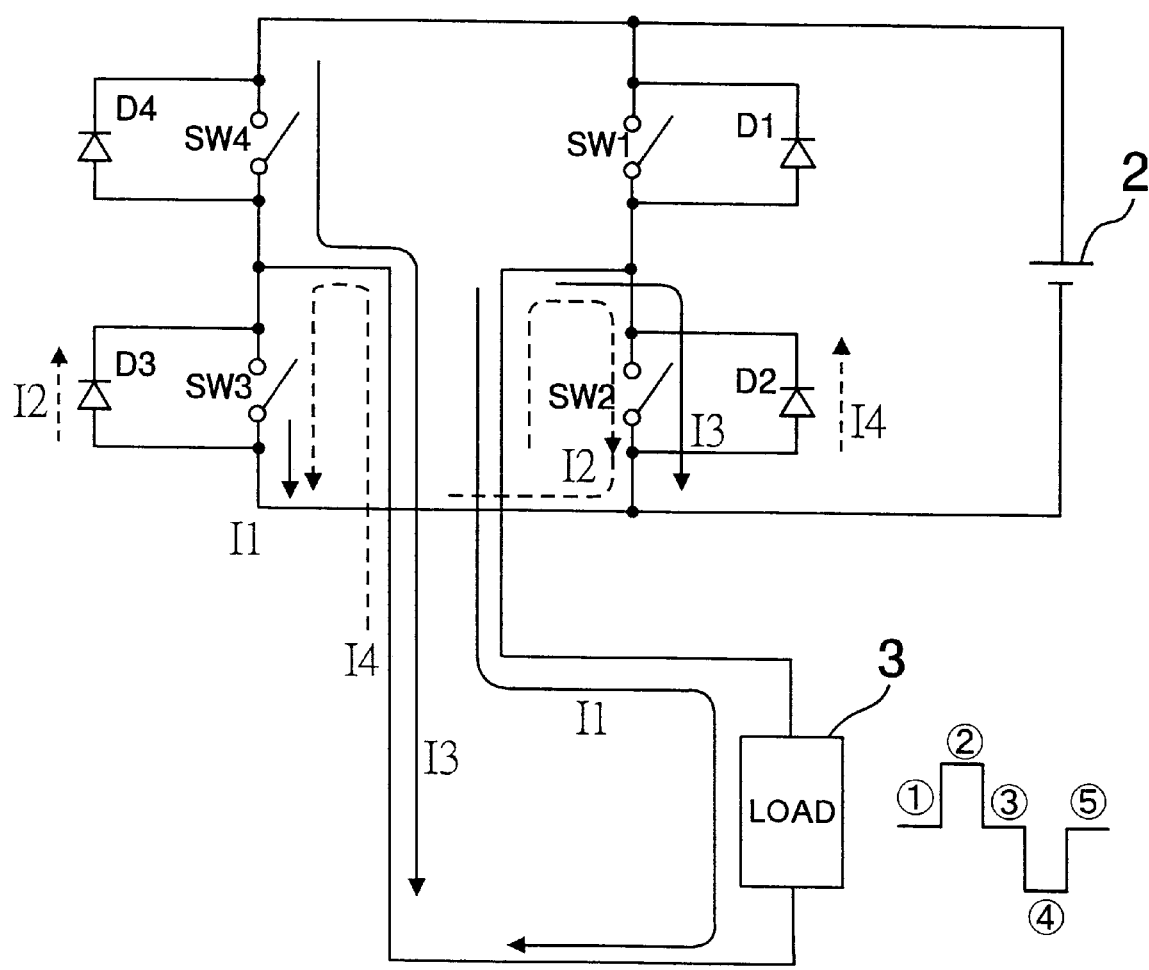
FIG. 2 is an equivalent circuit diagram of an H-bridge switching circuit shown in FIG. 1.

FIG. 2 shows an equivalent circuit of the H-bridge switching circuit 1. As seen from FIG. 3, the time width with which the second semiconductor switching element SW2 is turned off is longer than and extends forwardly and backwardly in time of the time width with which the first semiconductor switching element SW1 is turned on. On the other hand, the time width with which the third semiconductor switching element SW3 is turned off is longer than and extends forwardly and backward of the time width with which the fourth semiconductor switching element SW4 is turned on.

Referring to FIG. 2, if the first semiconductor switching element SW1 is turned on after it is turned off, then current flows in the direction indicated by an arrow mark I1 and a load 3 is charged in the positive with the current. Then, if the second semiconductor switching element SW2 is turned on after the first semiconductor switching element SW1 is turned off, then current flows in a direction indicated by an arrow mark I2 through the second semiconductor switching element SW2 and the diode D3. Consequently, a leakage impedance and a floating capacitance of the load 3 are compulsorily reset by the second semiconductor switching element SW2 and the diode D3.

Thereafter, if the fourth semiconductor switching element SW4 is turned on after the third semiconductor switching element SW3 is turned off, then current flows in a direction indicated by an arrow mark I3, and the load 3 is charged in the negative with the current. Then, if the third semiconductor switching element SW3 is turned on after the fourth semiconductor switching element SW4 is turned off, then current flows in a direction indicated by an arrow mark I4, and a leakage impedance and a floating capacitance of the load 3 are compulsorily reset by the second semiconductor switching element SW2 and the diode D3.

Such operations as described above are described with reference to Table 2 above.

In the stage ①, the second semiconductor switching element SW2 and the third semiconductor switching element SW3 are turned on in response to gate signals inputted thereto, and the load 3 is put into a short-circuited condition.

In the stage ②, the second semiconductor switching element SW2 is turned on in response to a gate signal inputted thereto, and then, the first semiconductor switching element SW1 is turned on in response to a gate signal inputted thereto a little later. Consequently, since the third semiconductor switching element SW3 remains off, current flows in the direction I1 from the first semiconductor switching element SW1 through the load 3 and charges the load 3 to the positive.

In the stage ③, the inputting of the gate signal to the first semiconductor switching element SW1 is ended, and consequently, the first semiconductor switching element SW1 is turned off. Then, a gate signal is inputted to the second semiconductor switching element SW2 again to turn the second semiconductor switching element SW2 on again. Consequently, the charge accumulated in the load 3 discharges through the second semiconductor switching element SW2 and the diode D3. As a result, the state in the stage ① is restored.

In the stage ④, the third semiconductor switching element SW3 is turned off, and a little later, a gate signal is inputted to the fourth semiconductor switching element SW4 to turn the fourth semiconductor switching element SW4 on. Consequently, since the second semiconductor switching element SW2 remains on, current flows in the direction indicated by an arrow mark I3 from the fourth semiconductor switching element SW4 through the load 3 and charges the load 3 to the negative.

In the stage ⑤, the inputting of the gate signal to the fourth semiconductor switching element SW4 is ended to turn the fourth semiconductor switching element SW4 off, and then a gate signal is inputted to the third semiconductor switching as a load.

Figure 10:
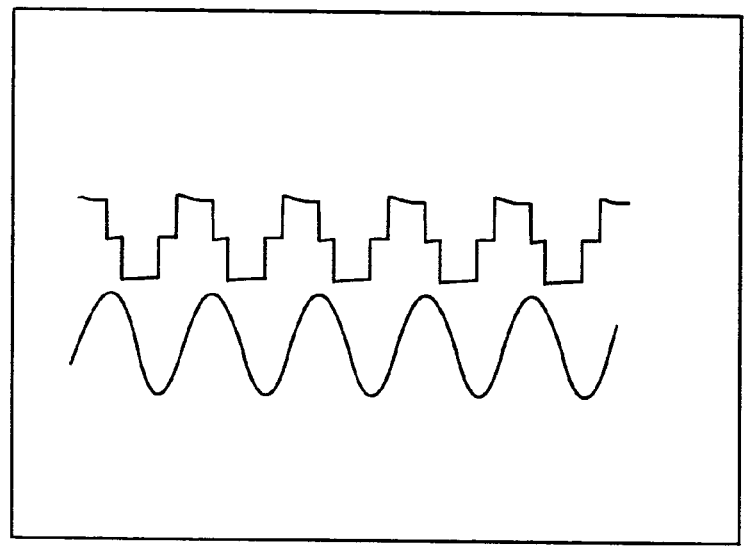
FIGS. 10(A) and 10(B) are waveform diagrams showing output voltage waveforms and load current waveforms of the H-shaped bridge switching circuit of FIG. 2.
Figure 10:
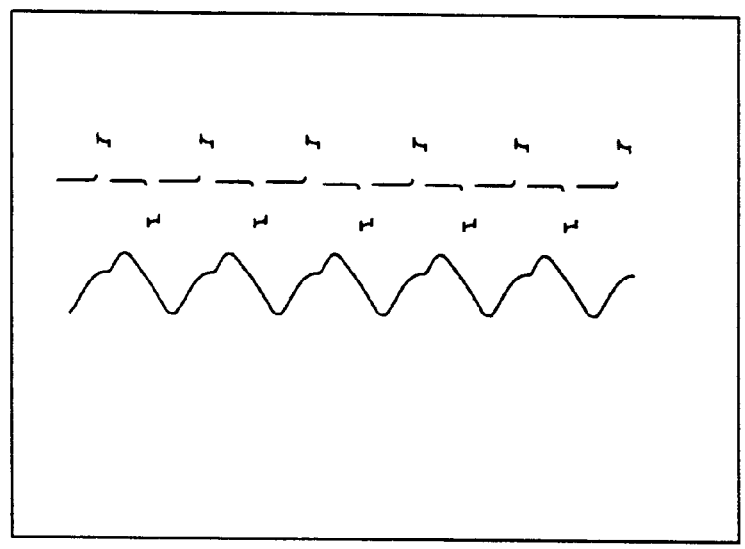

FIG. 10(A) shows a waveform of an output voltage VX1 and a load current waveform of the H-bridge switching circuit 1 when the duty ratio is 50%. As can be seen from FIG. 10(A), the first semiconductor switching element SW1 and the second semiconductor switching element SW2 are first zero volt switched so that the first semiconductor switching element SW1 is turned on and the second semiconductor switching element SW2 is turned off, and thereupon, current flows in the direction indicated by an arrow mark IS1 and a positive sine wave is outputted to the opposite terminals of the parasitic capacitance C1 of the first semiconductor switching element SW1.

Then, also when the first semiconductor switching element SW1 is turned off and the second semiconductor switching element SW2 is turned on, they are zero volt switched, and the voltage across the parasitic capacitance C1 becomes equal to zero volt. Then, also when the fourth semiconductor switching element SW4 is turned on and the third semiconductor switching element SW3 is turned off, they are zero volt switched, and now, current flows in the direction indicated by an arrow mark IS2 and a negative sine wave appears across the capacitor C. Then, when the fourth semiconductor switching element SW4 is turned off and the third semiconductor switching element SW3 is turned on, the voltage of zero volt appears across the capacitor C. When the duty ratio is 50%, the steps of operation element SW3 to turn the third semiconductor switching element SW3 on again. Consequently, the charge accumulated in the load 3 discharges through the third semiconductor switching element SW3 and the diode D2. As a result, the state in the stage ③ is restored.

In this manner, by successively switching the semiconductor switching elements SW1, SW2, SW3 and SW4 with dead times given thereto so that they may not be turned on simultaneously in each of the set of the first and second semiconductor switching elements SW1 and SW2 and the set of the third and fourth semiconductor switching elements SW3 and SW4, an output signal of a waveform proportional to that of an input signal (gate signal) is obtained. In this instance, since the floating capacitance and the leakage inductance of the load are reset by such a switching operation as described above, the output waveform obtained has no distortion.

The output of the H-bridge switching circuit 1 which performs such a switching operation as described above is extracted from a pole at the node between the first and second semiconductor switching elements SW1 and SW2 and another pole at the node between the third and fourth semiconductor switching elements SW3 and SW4 in FIG. 1 and inputted to the resonance circuit 4 which includes two inductance elements L1 and L2 and a capacitor C. Then, a voltage of a sine wave of a high frequency obtained by resonance of the resonance circuit 4 is applied to the primary side of a transformer 3 serving described above are performed repetitively.

As a result, since the load current exhibits a phase delay, the peak of the load current coincides with a point of time at which the output voltage waveform of the H-bridge switching circuit 1 completes its one cycle, and consequently, the resonance circuit 4 operates as a resonance circuit which delays the phase of an input signal by 90 degrees.

FIG. 10(B) shows a waveform of the output voltage VX1 and a load current waveform of the H-bridge switching circuit 1 when the duty ratio is 10%. First, the first semiconductor switching element SW1 and the second semiconductor switching element SW2 are zero volt switched so that the first semiconductor switching element SW1 is turned on and the second semiconductor switching element SW2 is turned off. Thereupon, current flows in the direction indicated by the arrow mark IS1 and a positive sine wave appears across the parasitic capacitance C1.

Also when the first semiconductor switching element SW1 is turned off and the second semiconductor switching element SW2 is turned on, they are zero volt switched, and the voltage of zero volt appears across the capacitor C. Thereafter, the rest state continues. Then, after the first semiconductor switching element SW1 is turned off and the second semiconductor switching element SW2 is turned on, no abnormal spike is produced on the output side within a period of the rest state since a leakage spike, a floating capacity and so forth which are produced on the load side are reset by the second semiconductor switching element SW2 and the diode D3.

Then, when the fourth semiconductor switching element SW4 is turned on and the third semiconductor switching element SW3 is turned off, zero volt switching of them is performed, and now, current flows in the direction of the arrow mark I2 and a negative sine wave appears across the parasitic capacitance C1. Then, also when the fourth semiconductor switching element SW4 is turned off and the third semiconductor switching element SW3 is turned on, zero volt switching is performed, and the voltage of zero volt appears across the capacitor C. Thereafter, the rest state continues.

After the fourth semiconductor switching element SW4 is turned off and the third semiconductor switching element SW3 is turned on, no spike appears on the output side within a period of the rest state since a leakage spike, a floating capacity and so forth which are produced on the load side are reset by the third semiconductor switching element SW3 and the diode D2.

As described above, even if the duty ratio is made comparatively low, the output waveform of the H-bridge switching circuit 1 exhibits a pulse waveform free from a leakage spike, and also the load current varies with a delayed phase. Consequently, the four semiconductor switching elements SW1, SW2, SW3 and SW4 are zero volt switched.

Figure 11:
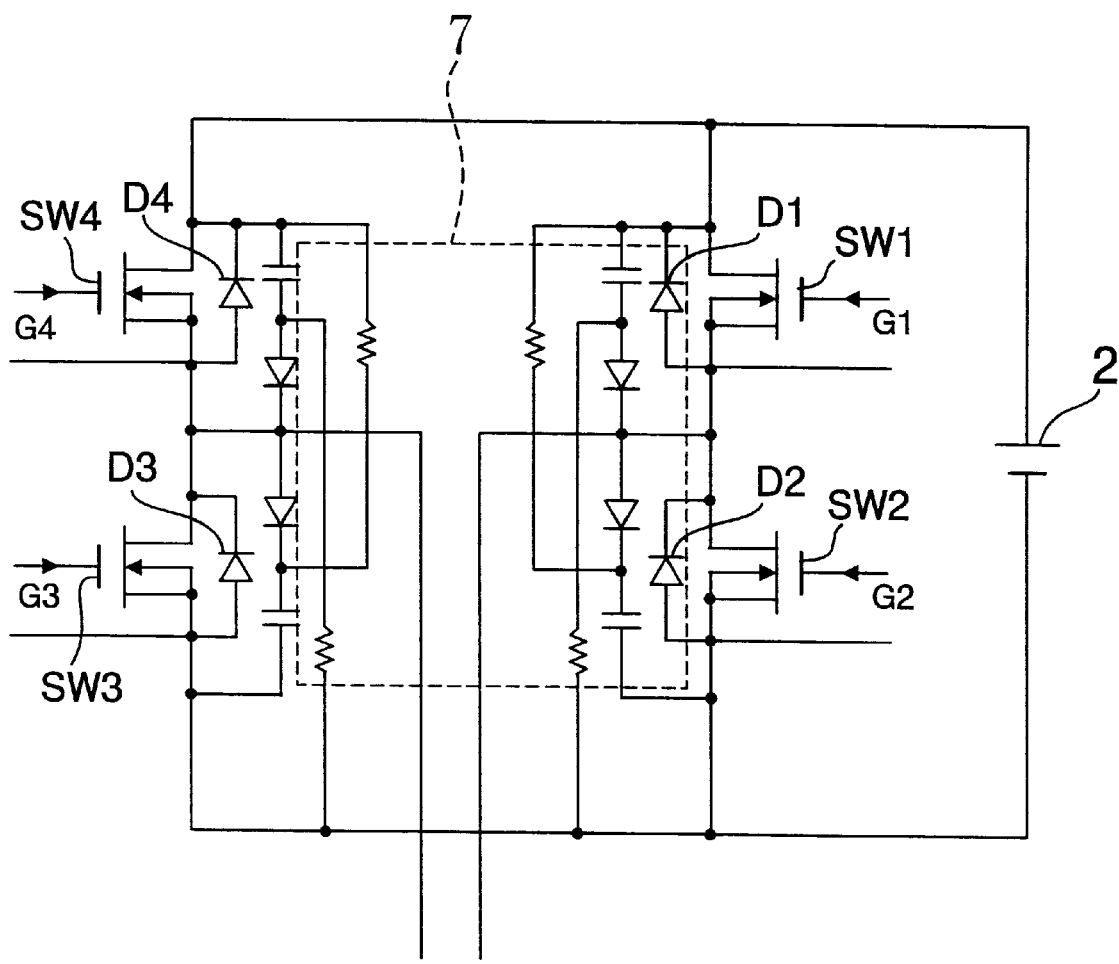
FIG. 11 is a circuit diagram showing a modification to the H-shaped bridge switching circuit shown in FIG. 1 which additionally includes a snubber circuit.
Figure 12:
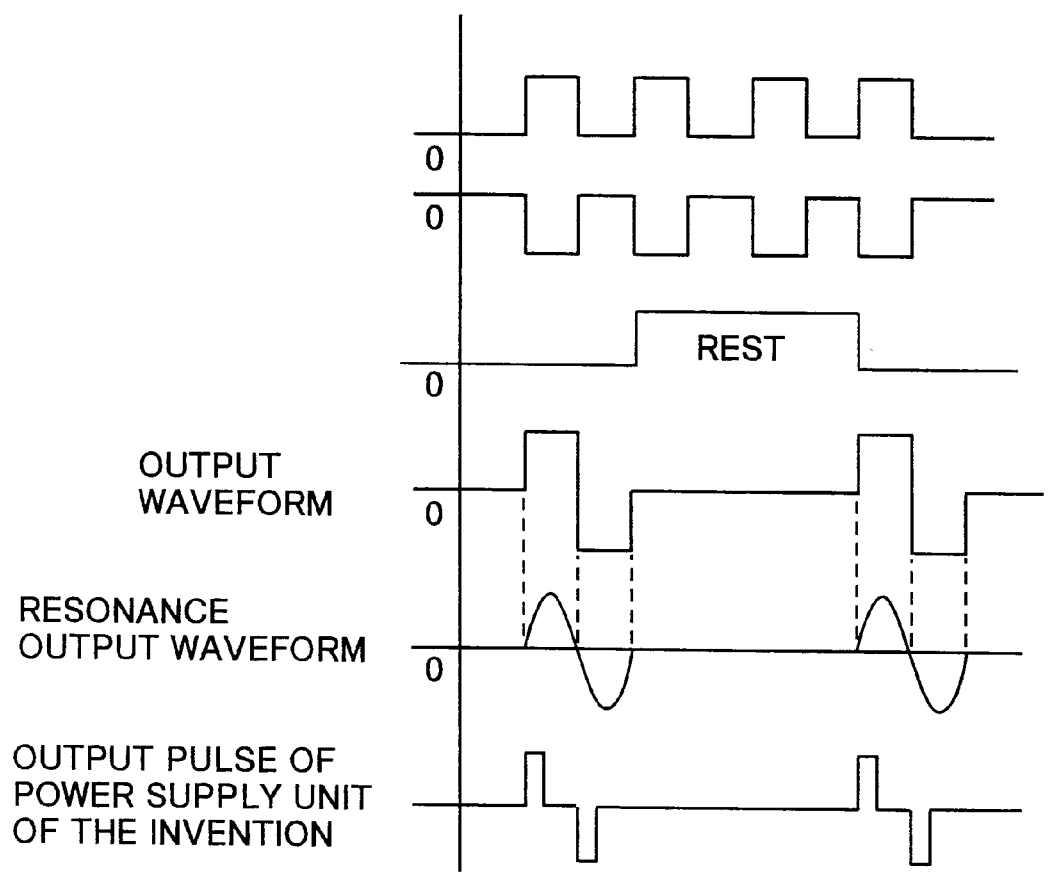
FIG. 12 is a timing chart illustrating operation of a conventional positive-negative pulse type high voltage power supply unit.
Figure 13:
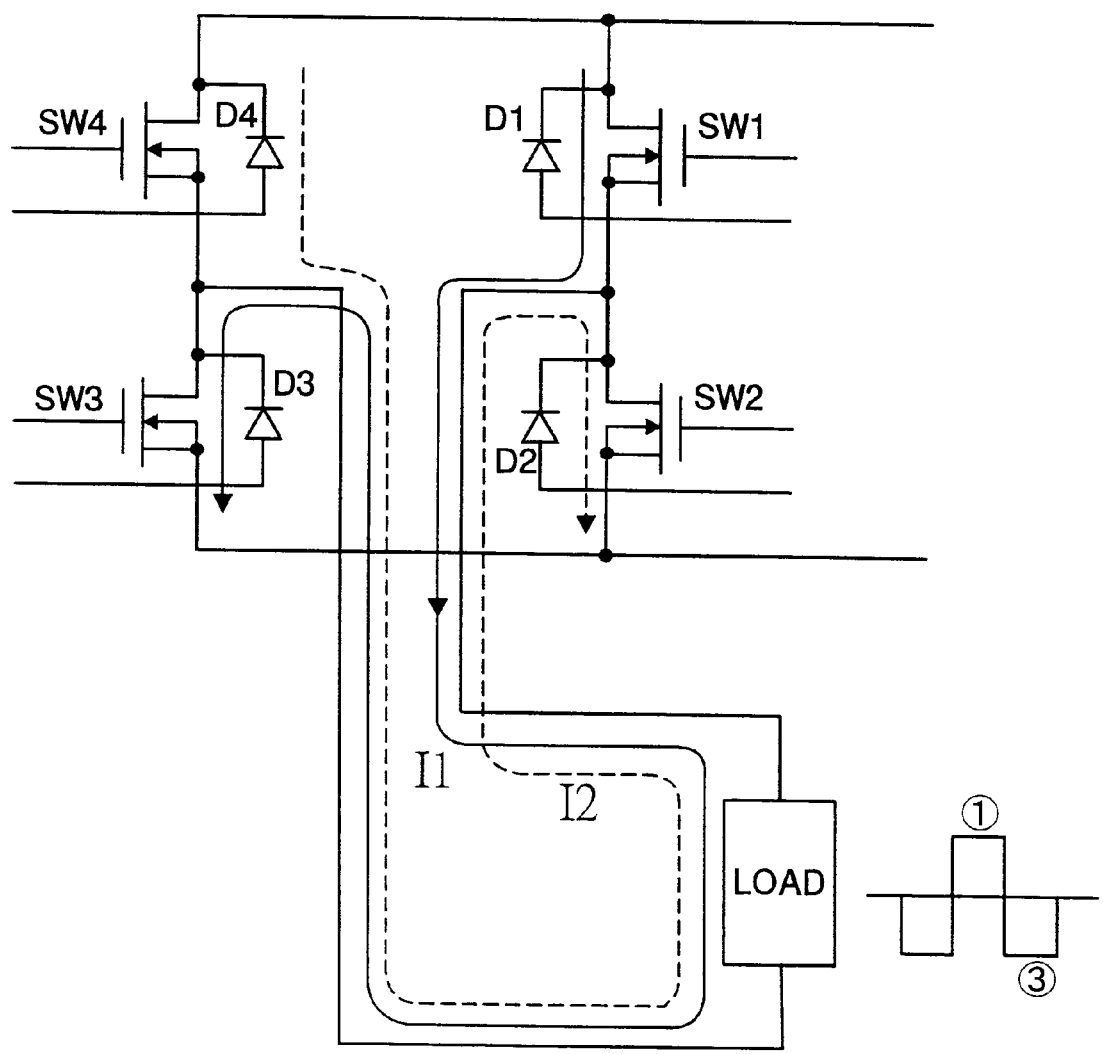
FIG. 13 is a circuit diagram showing a construction of a conventional H-bridge switching circuit and flows of current in the circuit.
Figure 14:
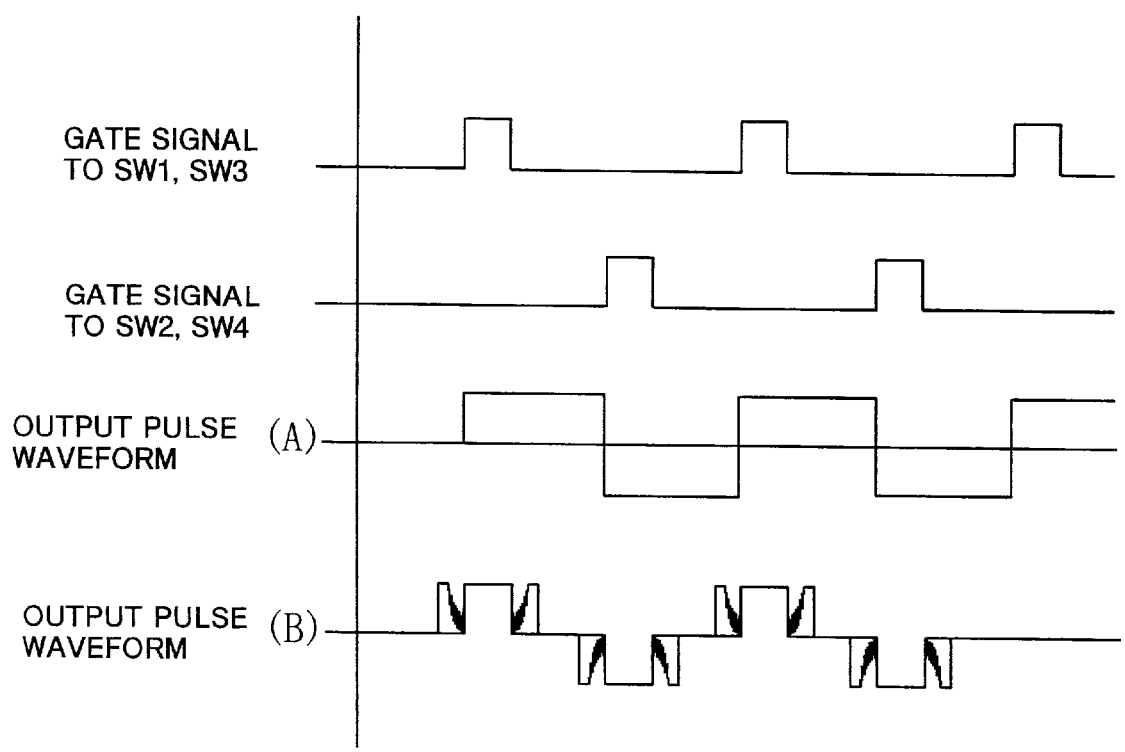
FIG. 14 is a timing chart illustrating the conventional H-bridge switching circuit of FIG. 13.

If such a snubber circuit 7 as shown in FIG. 11 is added to the H-bridge switching circuit 1, then surge current upon turning on and turning off of the semiconductor switching elements SW1, SW2, SW3 and SW4 can be absorbed by the snubber circuit 7. Consequently, switching noise and switching loss can be prevented with a higher degree of certainty.

A circuit configuration which controls the gates of the four semiconductor switching elements SW1, SW2, SW3 and SW4 so that they may effect zero volt switching as described above and performs feedback control so that such a high frequency output of a sine wave as described above may be fixed with regard to one of the voltage, current and power.

Referring to FIG. 1, a voltage of the resonance circuit 4 (a primary voltage to the transformer 3) is detected by a pulse transformer PT serving as voltage detection means and inputted to an effective value conversion circuit 8, by which a voltage effective value is extracted from the inputted voltage. Current of the resonance circuit 4 (primary current of the transformer 3) is detected by a current detector CT serving as current detection means and inputted to an effective value conversion circuit 9, by which a current effective value is extracted from the inputted current. The voltage effective value and the current effective value are multiplied by a multiplication circuit 10 to calculate a power effective value.

The voltage effective value of the effective value conversion circuit 8, the current effective value of the effective value conversion circuit 9 and the power effective value of the multiplication circuit 10 are inputted to error amplifiers 11, 12 and 13, respectively, by which they are compared with output preset values therefor. Consequently, signals corresponding to errors of the effective values from the respective output set values are outputted from the error amplifiers 11, 12 and 13. The positive-negative pulse type high frequency switching power supply unit of the present embodiment includes a mode changeover switch 14 for selecting a control mode from among a voltage control mode, a current control mode and a power control mode, and a voltage Vref set arbitrarily by an output setter 15 is inputted as the output preset value to one of the error amplifiers 11, 12 and 13 selected by the mode changeover switch 14.

The error amplifiers 11, 12 and 13 are connected to the mode changeover switch 14 by input changeover switches 16, 17 and 18 connected thereto, respectively. The error amplifiers 11, 12 and 13 can be connected further to a voltage limiter 19, a current limiter 20 and a power limiter 21 by the input changeover switches 16, 17 and 18, respectively.

The three input changeover switches 16, 17 and 18 operate in an interlocking relationship with the mode changeover switch 14 such that, if the mode changeover switch 14 is switched to a terminal 1 thereof, then a voltage control mode is established and the current limiter 20 and the power limiter 21 are selected by the input changeover switches 17 and 18, respectively. If the mode changeover switch 14 is switched to a terminal 2 thereof, then a current control mode is established and the voltage limiter 19 and the power limiter 21 are selected by the input changeover switches 16 and 18, respectively. If the mode changeover switch 14 is switched to a terminal 3 thereof, then a power control mode is established and the voltage limiter 19 and the current limiter 20 are selected by the input changeover switches 16 and 17, respectively.

The three error amplifiers 11, 12 and 13 are provided for voltage control, current control and power control, respectively, and compare a voltage effective value, a current control value and a power control value with respective preset values and output signals corresponding to errors of them. The outputs of the error amplifiers 11, 12 and 13 are inputted to the PWM control circuit 5 through diode OR circuits 22, 23 and 24, respectively. In this instance, they are inputted preferentially such that the output of the error amplifier 11 is inputted most preferentially, and then the output of the error amplifier 12 is inputted, and finally, the output of the error amplifier 13 is inputted. The PWM control circuit 5 thus varies the width of a pulse to be inputted to the gate drive circuit 6 in the order of voltage control, current control and power control.

Figure 6:
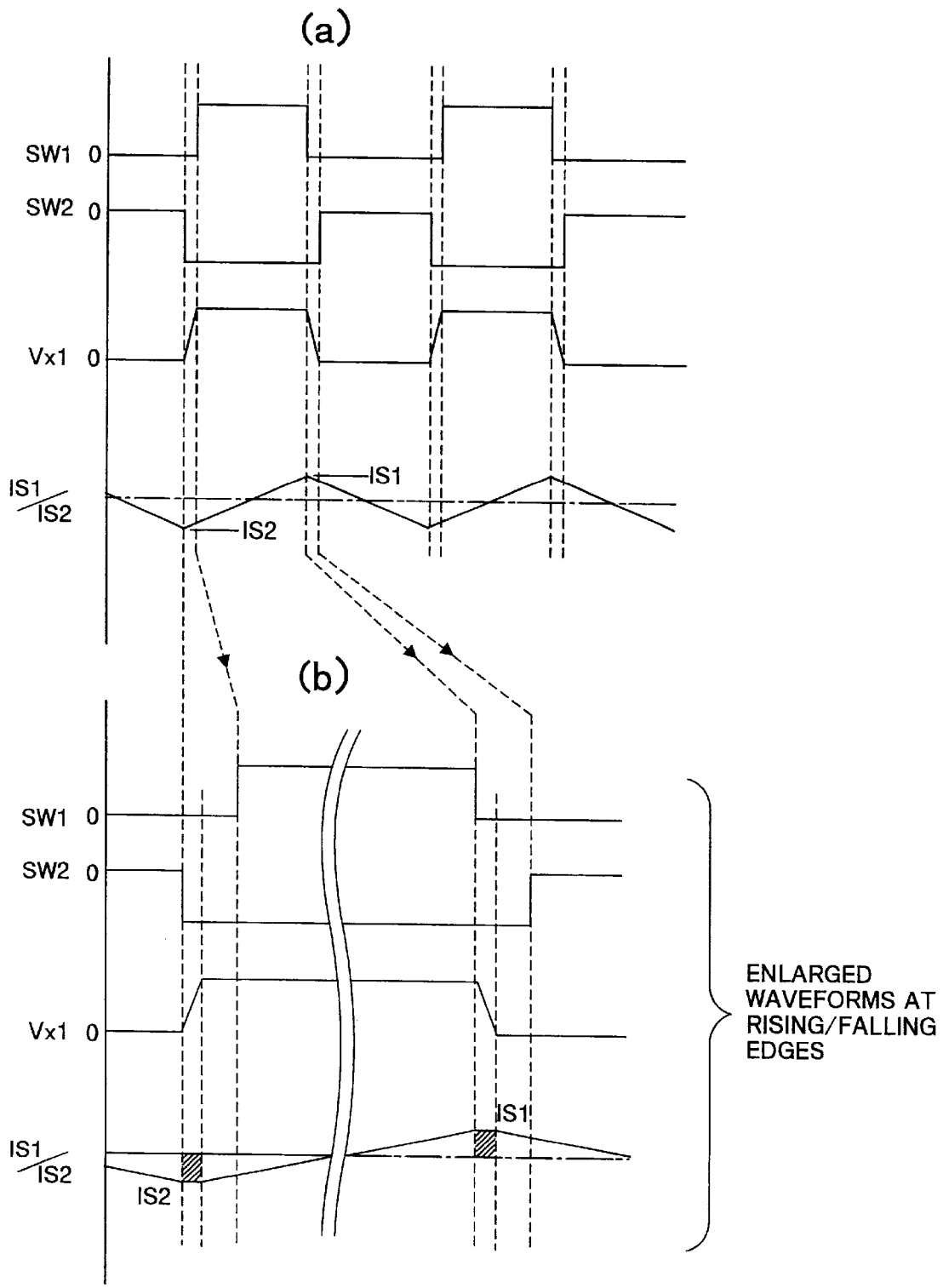
FIGS. 6(a) and 6(b) are timing charts illustrating the operation illustrated in FIGS. 4 and 5.
Figure 7:
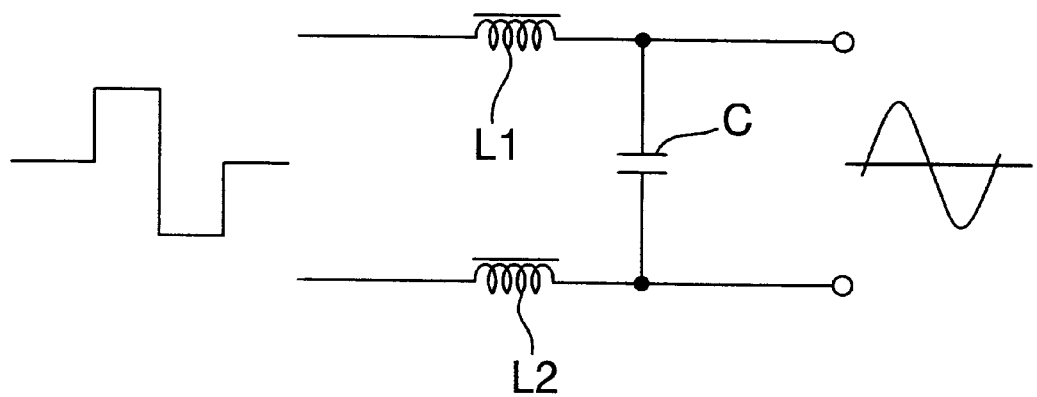
FIG. 7 is a circuit diagram illustrating operation of a resonance circuit.
Figure 8:
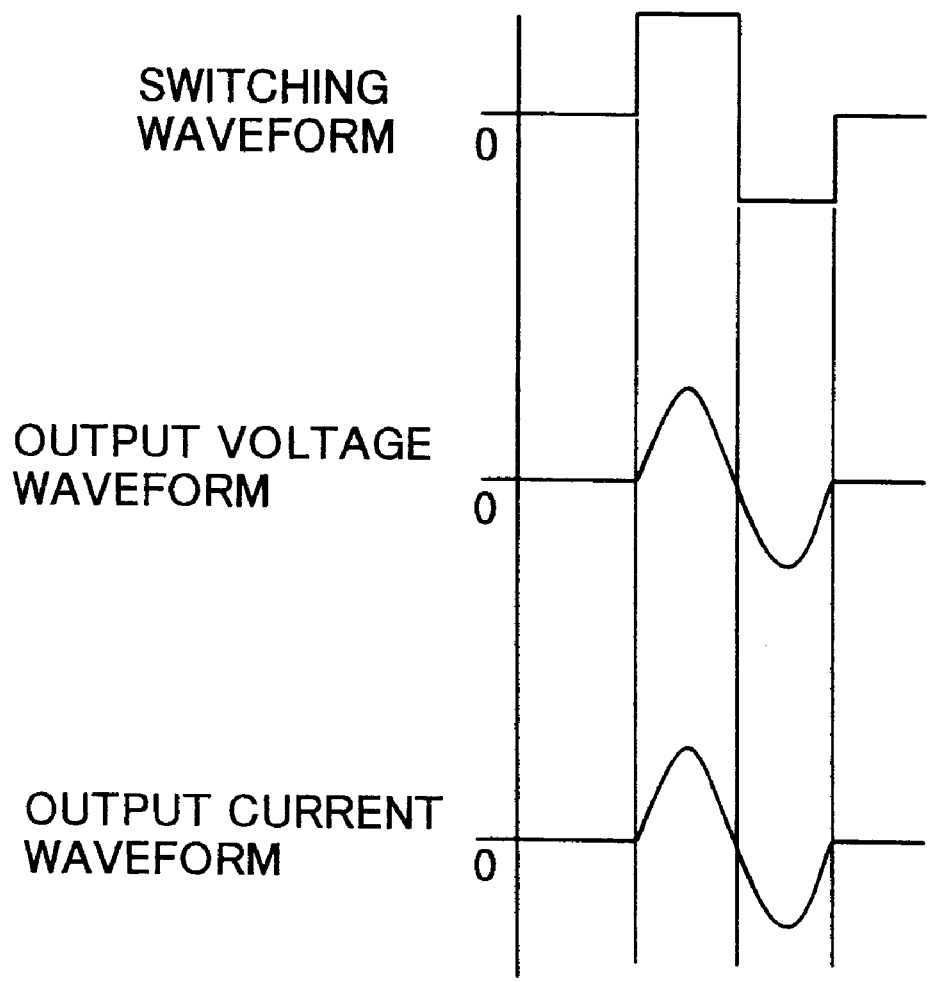
FIG. 8 is a timing chart showing a switching waveform, an output voltage waveform and an output current waveform of a semiconductor switching element.
Figure 9:
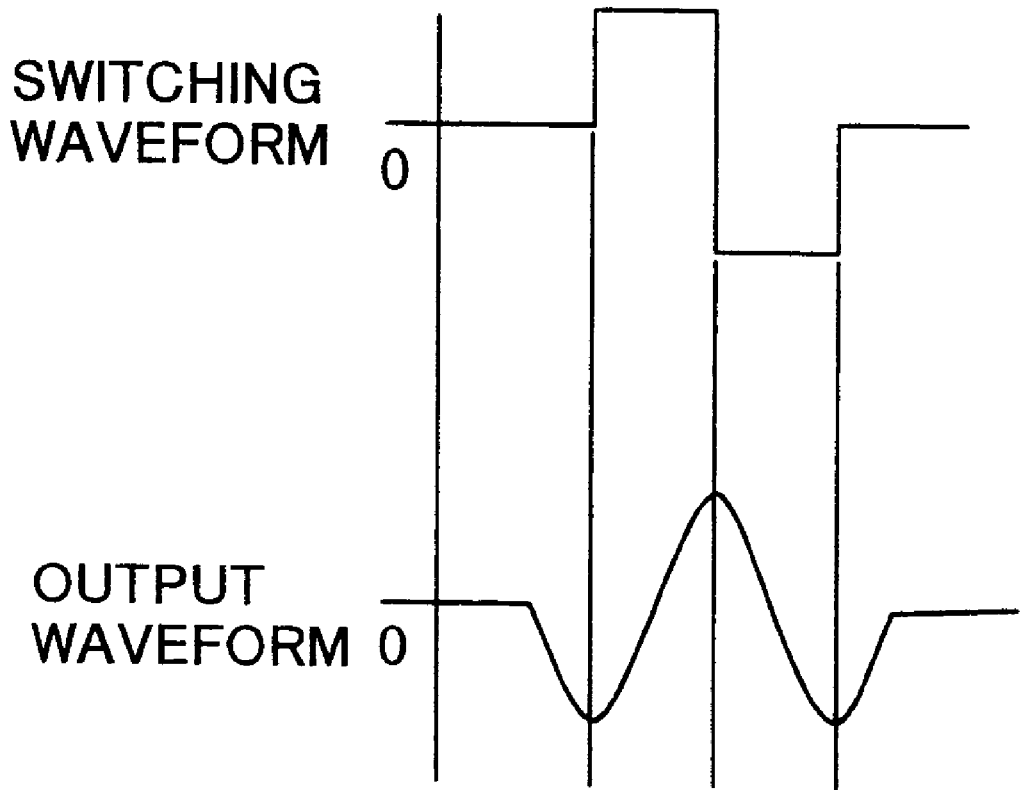
FIG. 9 is a timing chart showing a switching waveform and an output waveform as an ideal sine waveform of a semiconductor switching element.

The gate drive circuit 6 supplies gate signals in accordance with the control of the PWM control circuit 5 to the gates of the four semiconductor switching elements SW1, SW2, SW3 and SW4 of the H-bridge switching circuit 1 so that the semiconductor switching elements SW1, SW2, SW3 and SW4 effect zero volt switching at such timings as described hereinabove with reference to FIG. 6.

While a preferred embodiment of the present invention has been described using specific terms, such description is for illustrative purposes only, and it is to be understood that changes and variations may be made without departing from the spirit or scope of the following claims.

What is claimed is:

1. A positive-negative pulse type high frequency switching power supply unit, comprising:

an H-bridge switching circuit including four first, second, third and fourth semiconductor switching elements connected in an H-bridge connection and first, second, third and fourth diodes connected in parallel to said first, second, third and fourth semiconductor switching elements, respectively, a dc voltage being applied to said first, second, third and fourth semiconductor switching elements;

a resonance circuit which resonates with a positive-negative pulse wave outputted from said H-bridge switching circuit; and a pulse width modulation control circuit for detecting a voltage or current of said resonance circuit and controlling said first, second, third and fourth semiconductor switching elements to successively and repetitively perform switching operations in an on/off switching pattern including a first stage wherein said first and fourth semiconductor switching elements are off and said second and third semiconductor switching elements are on, a second stage wherein said first and third semiconductor switching elements are on and said second and fourth semiconductor switching elements are off, a third stage wherein said first and fourth semiconductor switching elements are off and said second and third semiconductor switching elements are on, a fourth stage wherein said first and third semiconductor switching elements are off and said second and fourth semiconductor switching elements are on, and a fifth stage wherein said first and fourth semiconductor switching elements are off and said second and third semiconductor switching elements are on so that said first, second, third and fourth semiconductor switching elements may switch in a switching frequency higher than a resonance frequency of said resonance circuit.

2. A positive-negative type high frequency switching power supply unit as claimed in claim 1, wherein said second and third diodes are off in the first and second stages; said second diode is off and said third diode is on in the third stage; said second and third diodes are off in the fourth stage; and said second diode is on and said third diode is off in the fifth stage.

3. A positive-negative type high frequency switching power supply unit as claimed in claim 1, wherein said pulse width modulation control circuit supplies gate pulses to gates of said first, second, third and fourth semiconductor switching elements so that the time width with which said second semiconductor switching element is turned off is longer than and extends forwardly and backwardly in time of the time width with which said first semiconductor switching element is turned on whereas the time width with which said third semiconductor switching element is turned off is longer than and extends forwardly and backwardly in time of the time width with which said fourth semiconductor switching element is turned on.

4. A positive-negative type high frequency switching power supply unit as claimed in claim 1, further comprising voltage detection means for detecting a voltage of said resonance circuit, effective value conversion means for converting the detected voltage into a voltage effective value, current detection means for detecting current of said resonance circuit, effective value conversion means for converting the detected current into a current effective value, and an effective value selection circuit for comparing the voltage effective value and the current effective value from both of said effective value conversion means with respective preset values to detect differences and selectively feeding back one of the differences to said pulse width modulation control circuit.

* * * * *